United States Patent [19]

Heartz

[11] Patent Number: 4,583,185

[45] Date of Patent: Apr. 15, 1986

[54] INCREMENTAL TERRAIN IMAGE GENERATION

[75] Inventor: Robert A. Heartz, DeLand, Fla.

[73] Assignee: General Electric Company, Syracuse, N.Y.

[21] Appl. No.: 546,599

[22] Filed: Oct. 28, 1983

[51] Int. Cl.$^4$ ............................................. G09B 9/00
[52] U.S. Cl. .................................. 364/521; 340/700; 364/522
[58] Field of Search ............... 364/521, 522; 340/700, 340/711, 825.7; 358/903

[56] References Cited

U.S. PATENT DOCUMENTS

| | | | |
|---|---|---|---|
| 3,602,702 | 8/1971 | Warnock | 235/151 |
| 3,621,214 | 11/1971 | Romney | 235/151 |
| 3,665,408 | 5/1972 | Erdahl et al. | 340/172.5 |
| 3,671,729 | 6/1972 | Lux | 235/186 |
| 3,736,564 | 5/1973 | Watkins | 340/172.5 |
| 3,769,442 | 10/1973 | Heartz et al. | 35/10.4 |
| 4,017,985 | 4/1977 | Heartz | 35/10.4 |
| 4,179,823 | 12/1979 | Sullivan et al. | 364/521 X |
| 4,219,763 | 8/1980 | Dalke | 364/521 X |
| 4,343,037 | 8/1982 | Bolton | 364/521 |
| 4,399,512 | 8/1983 | Soma et al. | 364/521 X |

Primary Examiner—Errol A. Krass
Assistant Examiner—Heather R. Herndon
Attorney, Agent, or Firm—Carl W. Baker; Richard V. Lang

[57] ABSTRACT

An algorithm for the real-time computer generation of visual scenes reduces the processing of elevation data to simple repetitive accumulations and a compare opertion to generate occult data using grid elevation data bases. The approach, when implemented as a software or firmware program, significantly speeds up scene generation time, and when implemented in hardware, significantly reduces the amount of hardware required. Accumulator (16) or counter (38) accumulates increments in tangent of the view angle, while accumulator (18) or counter (40) accumulates increments in range. Depending on the outcome of the compare operation of comparator (32), the accumulated tangent of the view angle or the accumulated range is used to compute in subtractor (26) the elevation of the view ray at each range increment of a sweep. This computed elevation is compared in comparator (32) with the corresponding elevation data for that point in the grid data base.

6 Claims, 7 Drawing Figures

FIG.1
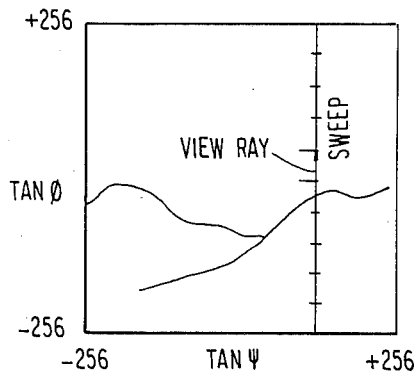
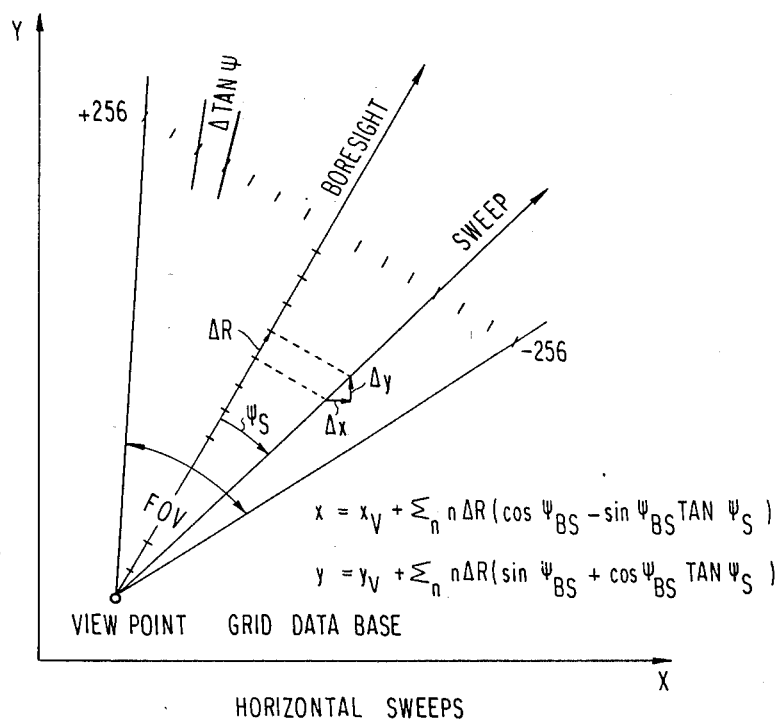
$$x = x_V + \sum_n n\Delta R(\cos \Psi_{BS} - \sin \Psi_{BS} \text{TAN } \Psi_S)$$
$$y = y_V + \sum_n n\Delta R(\sin \Psi_{BS} + \cos \Psi_{BS} \text{TAN } \Psi_S)$$
HORIZONTAL SWEEPS
FIG.2

VERTICAL VIEW RAYS

INCREMENTAL TERRAIN IMAGE GENERATION

FIELD OF THE INVENTION

This invention generally relates to a system and technique for the generation of images on a display device, and more particularly to real-time computer simulation of visual images of perspective scenes such as landscapes and seascapes.

BACKGROUND OF THE INVENTION

The principle application area for computer image generation (CIG) has been that of visual training simulators which present scenes to an observer or trainee to allow the observer to practice some task, such as flying an airplane. In a flight simulator, a three-dimensional model of the desired "gaming area" is prepared and stored on magnetic disk or similar bulk storage media. This model is called the visual data base. The visual simulator combines an image generator with an electro-optical display system such as a cathode ray tube (CRT) or similar display. The image generator reads in blocks of three-dimensional data from the disk and transforms this data into two-dimensional scene descriptions. The two-dimensional data are converted to analog video that is presented to the operator or trainee via the display. The generated imagery is meant to be representative of the true scenes that the operator would see if the operator were actually performing the task being simulated. The generation of the display images is said to be in "real time" which is normally taken to mean 30 frames per second, as in the U.S. television standard. CIG systems are described in detail in the book entitled *Computer Image Generation* edited by Bruce J. Schacter and published by Wiley-Interscience (1983).

Computer generation of visual representations of objects whose various vertices, edges and planes are defined by data bases referenced to a system of axes is described in U.S. Pat. Nos. 3,602,702 to Warnock, 3,621,214 to Romney et al., and 3,665,408 to Erdahl et al. These teach general means for converting such data into a two-dimensional perspective view, with tests for determining which of several overlapping objects will be visible and conceal the others. The scan employed for presentation of the visual image on a cathode-ray tube (CRT) is a conventional horizontally scanned raster. U.S. Pat. No. 3,671,729 to Lux teaches means to cause a mechanical plotter to draw curves or profiles (provided as electrical input signals giving elevation and range for successive radial scans) in which the profile parts which would be out of the field of view of an elevated observer are omitted. The device is not indicated as having any application to electronic image generation, nor does it appear that it could be so applied. U.S. Pat. No. 3,736,564 to Watkins teaches the conversion of electrical signals defining surfaces of a three-dimensional object onto a two-dimensional image or view plane defined by a raster scan device such as a CRT. The converted signals defining the surfaces to be displayed are determined by comparing the relative depths of segments of the surfaces along each scan line of the display and selectively subdividing the scan lines according to the visual characteristics of the segments when necessary. Signals defining the visible segments are then utilized to control the intensity of the display.

The real-time computer generation of visual images of landscapes and seascapes find particular use in aircraft or ship simulators. U.S. Pat. No. 3,769,442 to Heartz et al. describes a process for producing a compressed data base for a radar land mass simulator. U.S. Pat. No. 4,017,985 to Heartz describes a process for the generation of a perspective scene in which the tangent of the view angle is computed for each range element along a sweep. This process requires a high speed multiply and divide to compute the tangent which is then compared to a stored maximum to determine if the element is seen. If it is seen, it is compared to the last value to fill in skipped pixels. U.S. Pat. No. 4,343,037 to Bolton describes a visual display system in which a pipeline processor is used to compute in real-time the perspective transformation from the textured ground surface plane to the display plane. Application Ser. No. 527,809 filed Aug. 30, 1983, by M. Bunker et al. and assigned to the assignee of this application discloses techniques to reduce dynamic aliasing problems in real time images generated from a textured grid data base. These techniques may be applied to the invention disclosed herein in order to refine the images produced.

Real-time generation of visual scenes is at best a difficult computational problem. The more realistic the scene, the more complex the computational problem seems to become. This in turn imposes a severe requirement on the hardware design. What is needed is a technique for simplifying the computations required for the real-time generation of visual displays without sacrifice of realism to the displayed scene.

SUMMARY OF THE INVENTION

It is therefore an object of the present invention to provide a unique computer generated real-time display wherein the hardware requirements are greatly simplified.

It is another object of the invention to provide an algorithm for the real-time computer generation of visual scenes that uses a few simple mathematical functions resulting in a significant speed-up of scene generation time.

The objects of the invention are accomplished by a process that replaces the multiply and divide operations normally performed with simple, repetitive accumulate operations. Seen elements and pixel fill-in are implemented by a single compare. The range elements of the sweep are scanned by progressively incrementing a delta view angle tangent. Occulting is determined by comparing the projection on the Z axis of delta view angle tangent at the element range to the altitude minus element elevation. If the projection is greater than altitude minus element elevation, the point is seen and the delta tangent view angle is incremented. Otherwise, the point is hidden and the range element is incremented. The invention uses an X-Y grid data base as opposed to vector schemes used in the prior art. Since only simple addition operations performed with an accumulator and a compare operation are used, the mathematical processing is greatly simplified in contrast with the multiplication and division operations resorted to by the prior art. This approach, when implemented as a software or firmware program, significantly speeds up scene generation time. When implemented in hardware, the amount of hardware required for real-time scene generation is significantly reduced. In fact, the simplicity of the hardware implementation lends itself to current gate array devices which would significantly reduce hardware requirements.

BRIEF DESCRIPTION OF THE DRAWINGS

The objects, advantages, and other aspects of the invention will be better understood from the following detailed description of the invention together with the drawings, in which:

FIG. 1 is a diagramatic illustration of a 512×512 element CRT display wherein the number of elements corresponds to the grid data base;

FIG. 2 is a graphical representation of the horizontal sweeps from the view point;

DETAILED DESCRIPTION OF THE INVENTION

Terrain occulting, that is what is hidden from a specific viewpoint, is a key calculation to all image generators. The invention provides a fast summation algorithm for generating occult data or perspective scenes using grid elevation data bases. Such grid data bases are produced, for example, by the Defense Mapping Agency (DMA). A DMA terrain elevation data base is typically a 512×512 array of elevation posts that are 300 feet apart. A corresponding planimetric grid data base defines feature colors such as for lakes, forests, snow caps, fields and so forth. The ray processing technique according to the invention is best illustrated by reference to FIGS. 1, 2, 3 and 4. First, a vertical column of the output image, i.e. a vertical raster, is defined as a sweep which is composed of 512 view ray elements, as shown in FIG. 1. The horizontal field of view (FOV) is defined as plus and minus 256 sweeps which are defined by equal increments perpendicular to the boresight. Any sweep is transformed to the grid data base as shown in FIG. 2. The processing starts incrementing $\Delta R$ from the view point. $\Delta R$ is shown as equal steps, but in practice, the $\Delta R$ steps are expanded as they move away from the view point. For any sweep, a $\Delta X$ and $\Delta Y$ can be defined. The accumulation of $\Delta X$ and $\Delta Y$ is the X,Y data base address which is used to extract the elevation and color for that sweep element.

Figure 3:
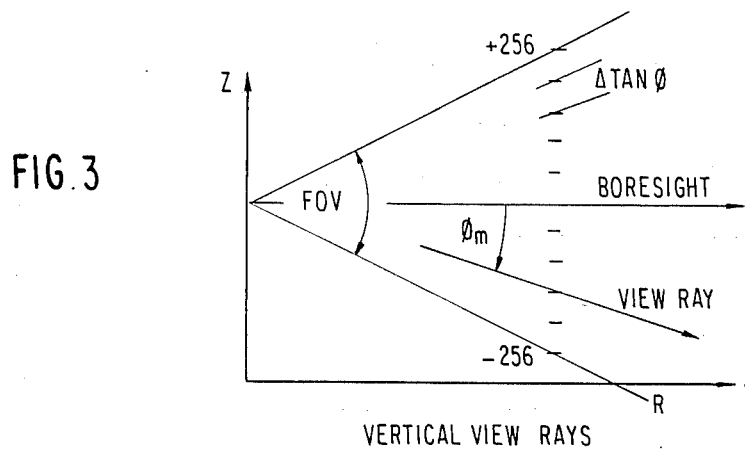
FIG. 3 is a graphical representation of the vertical sweeps from the view point.
Figure 4:
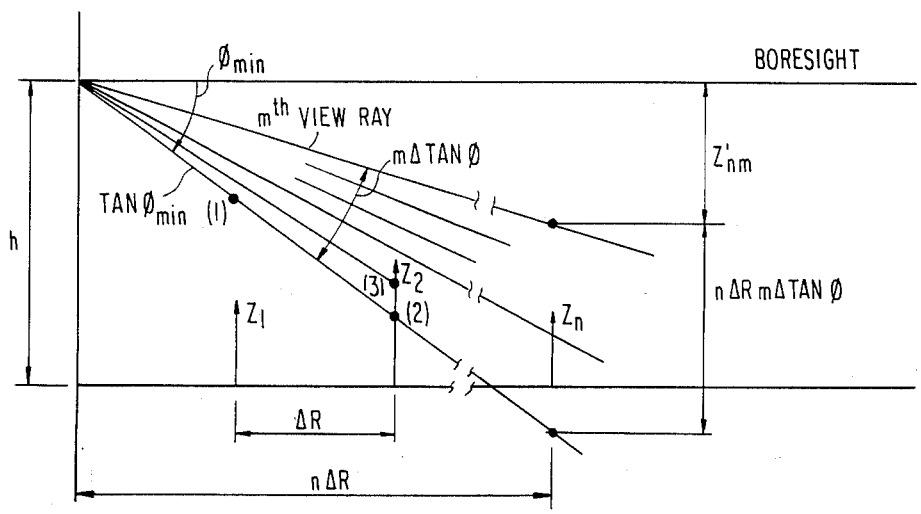
FIG. 4 is a graphical illustration of the view ray processing according to the invention.

For a given sweep, the vertical view rays are shown in FIG. 3. Again, the field of view is defined as plus or minus 256 equal steps normal to the view ray. The view ray processing is illustrated in FIG. 4. For each range increment, the view ray steps down by an increment of $\Delta R \tan \phi_{min}$. A simple compare at each range increment determines if the view ray strikes an elevation post. If the view ray is above the elevation post, the next elevation post and color is read from the data base. If the view strikes the post, the color for that post is read to the CRT display via a refresh memory.

Considering FIG. 4 in more detail, the edge of the vertical field of view is $\phi_{min}$. The first view ray projection (point 1) on the Z axis is $\Delta R \tan \phi_{min}$. Since $\Delta R$ Tan $\phi_{min}$ is less than $(h-Z_1)$, $Z_1$ does not intersect the field of view, and therefore we increment to the next elevation, $Z_2$. The projection of the view ray at $Z_2$ is $2\Delta R$ Tan $\phi_{min}$. This is greater than $(h-Z_2)$ which means that $Z_2$ is seen. The tangent of the view angle is incremented to point 3 and, again, $Z_2$ is seen. The tangent of the view angle is incremented until its projection on the Z axis is greater than $(h-Z_2)$, then we increment to the next elevation point and so forth. It is therefore evident that if a view ray strikes an elevation post, that point is seen and remains seen until the view ray is incremented to a point above the elevation post. If a view ray is above an elevation post, then the point is occulted.

The following equation is the view ray projection, $Z'_{nm}$, of the $n^{th}$ range increment and the $m^{th}$ increment in the view angle tangent:

$$Z'_{nm} = n\Delta R(\tan \phi_{min} - m\Delta \tan \phi)$$

Incrementing the tangent of the view angle results in the following equation:

$$Z'_{n(m+1)} = n\Delta R(\tan \phi_{min} - (m+1)\Delta \tan \phi)$$

Note that this equation can be expressed as the previous equation value plus an increment as follows:

$$Z_{n(m+1)} = n\Delta R\tan\phi_{min} - nm\Delta R\Delta \tan\phi - n\Delta R\Delta \tan\phi$$
$$= Z_{nm} - \text{increment}$$

Similarly, if range is incremented, the following equation results:

$$Z'_{(n+1)m} = (n+1)\Delta R(\tan \phi_{min} - m\Delta \tan \phi)$$

This equation can also be expressed as the first equation value plus an increment as follows:

$$Z_{(n+1)m} = n\Delta R\tan\phi_{min} - nm\Delta R\Delta \tan\phi + \Delta R\tan\phi_{min} - m\Delta R\Delta \tan\phi$$
$$= Z'_{nm} + \text{increment}$$

Figure 5:
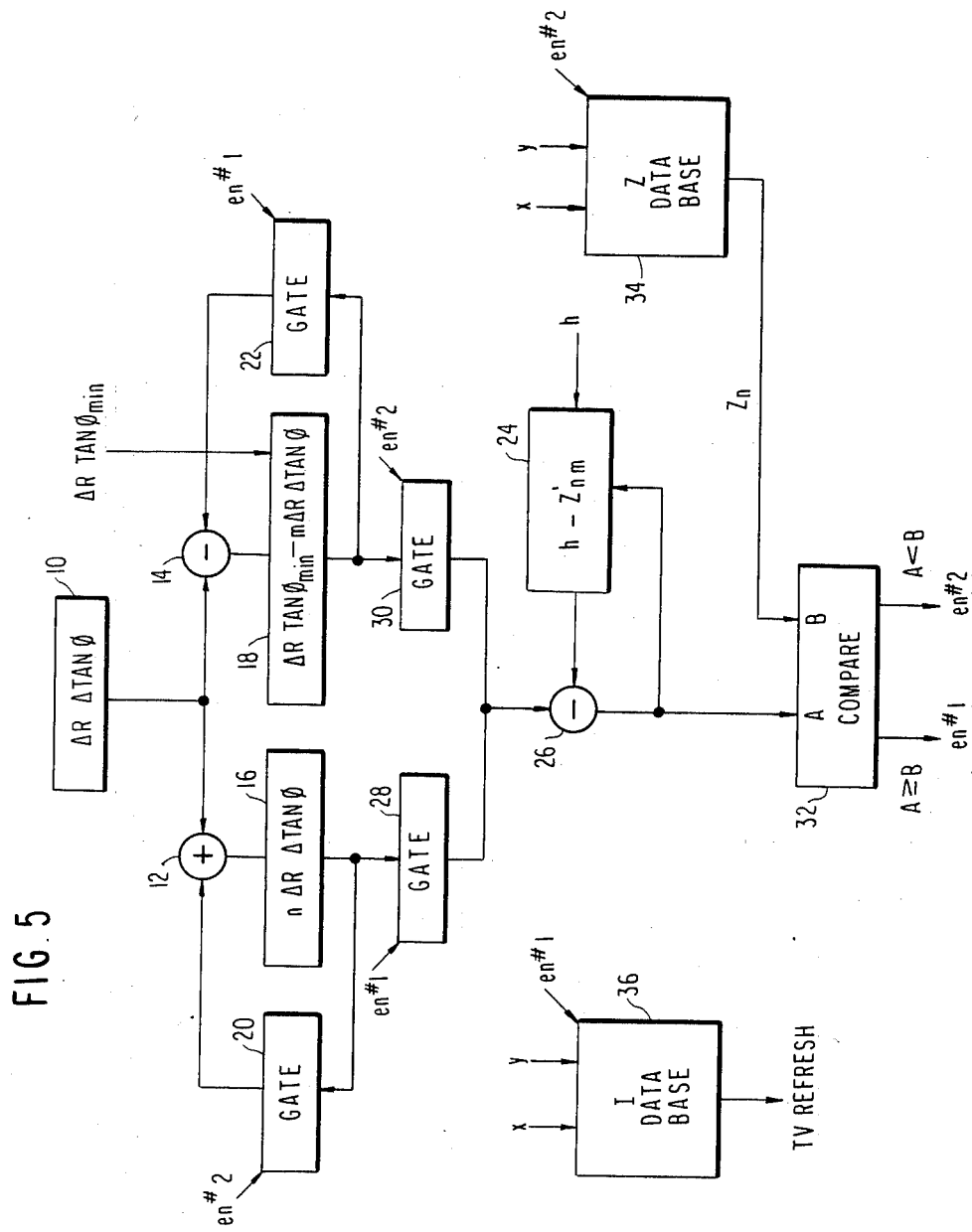
FIG. 5 is a block diagram of a direct hardware implementation of the inventive view ray processing technique.

FIG. 5 is a block diagram of a pipeline implementation of the occult algorithm according to the invention. As will be observed, this implementation is a simple gate array of registers and accumulators. Register 10 supplies a value corresponding to $\Delta R\Delta$ Tan $\phi$ to adder 12 and subtractor 14. The output of adder 12 is stored in register 16 which accumulates a value corresponding to $n\Delta R\Delta$ Tan $\phi$ which is the increment value resulting in incrementing the tangent of the view angle. The output of subtractor 14 is stored in register 18 which accumulates a value corresponding to $\Delta R$ Tan $\phi_{min} - m\Delta R$ Tan $\phi$ which is the increment value resulting in incrementing the range. Note that register 18 is preloaded with a value corresponding to $\Delta R$ Tan $\phi_{min}$. Whether the tangent of the view angle or the range is incremented is controlled by gates 20 and 22. Gate 20, when enabled, couples the output of register 16 to the other input of adder 12. Similarly, gate 22, when enabled, couples the output of register 18 to the other input of subtractor 14. Those skilled in the art will understand that register 16 in combination with adder 12 constitute an accumulator and register 18 in combination with subtractor 14 constitute another accumulator.

In the pipeline implementation shown in FIG. 5, there is another accumulator constituted by the register 24 and the subtractor 26. The register 24 is preloaded with the value of h, the elevation of the view point. The output of register 24 is supplied to one input of subtractor 26 while the other input is supplied from either register 16 or register 18 via gates 28 or 30, respectively, depending on whether the range or the tangent of the view angle is incremented. The output of this accumulator is the output of subtractor 26 which is stored in register 24 and supplied to input A of comparator 32. Input B of the comparator 32 is supplied from the Z grid data base 34. This data base like the I or intensity data base 36 is addressed by the X,Y coordinates of the sweep. The output of the I data base 36 is supplied to the CRT refresh memory. The data bases 34 and 36 are gated depending on whether the range or the tangent of the view angle is to be incremented.

Comparator 32 defines the next operation. If A<B, then range is incremented as denoted by en#1. If A≧B, then the tangent of the view angle is incremented as denoted by en#2. Table I shows the actions required for generating a perspective scene.

TABLE I

| PERSPECTIVE SCENE GENERATION | |
|---|---|
| Operation - En#1 | Operation - En#2 |
| Increment Range | Increment Tan View Angle |
| Read next Z | Write Pixel to Display |
| Increment NΔRΔTanφ | Increment MΔRΔTanφ |
| Read MΔRΔTanφ | Read NΔRΔTanφ |
| Summations | Summations |
| Compare | Compare |

Figure 6:
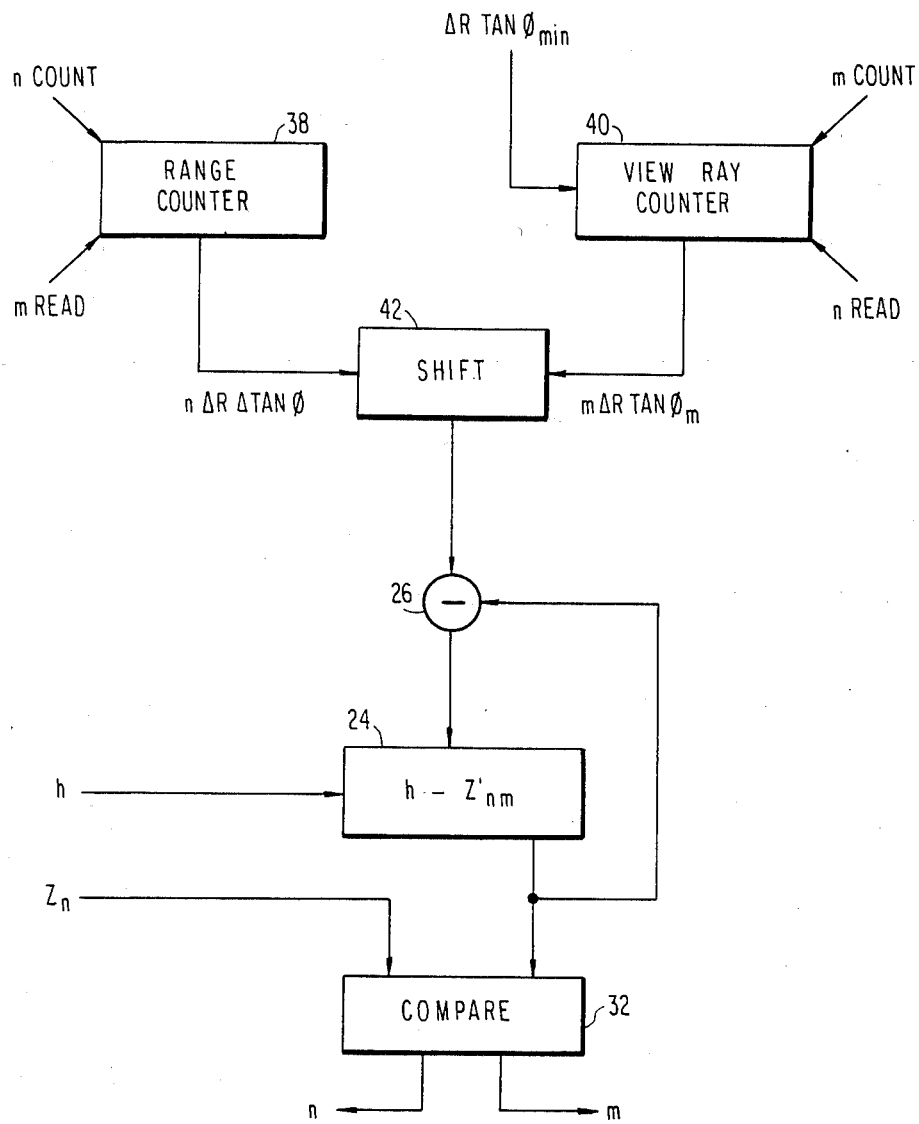
FIG. 6 is a block diagram of a simplified hardware implementation of the invention which takes advantage of certain redundancies inherent in the FIG. 5 implementation.

The direct pipeline implementation shown in FIG. 5 can be simplified as shown in FIG. 6. In this figure, the register 24, subtractor 26 and the comparator 32 are retained and operate as before; however, the first two accumulators here are implemented as counters. Specifically, the function of the accumulator composed of register 16 and adder 12 is performed by a range counter 38, and that of the accumulator composed of register 18 and subtractor 14 is performed by a view ray counter 40. The output en#1 of the comparator 32 is here denoted by n, while the output en#2 is here denoted by m. An output n from the comparator 32 causes counter 38 to increment and the output of counter 40 to be shifted into register 42 from which it is supplied as one input to subtractor 26. Conversely, an output m from the comparator 32 causes counter 40 to increment and the output of counter 38 to be shifted into register 42. Shifting the data in register implements a change in the ΔR step size. Those skilled in the art will appreciate that while a simplification in hardware has been achieved between the embodiments shown in FIGS. 5 and 6, the operation of the two embodiments is essentially the same.

A 512×512 image at a television rate of 30 frames per second requires a processing rate of approximately 100 nanoseconds per pixel. This invention requires sequential processing of 512 data base posts plus 512 pixels per sweep resulting in a pipeline processing rate of 50 nanoseconds per pixel. This rate is difficult to achieve with current digital devices. One way to achieve these rates is to parallel the sweep processing. This permits the use of very high density, but slower speed, memory devices. As the processing modules are simple and repetitiously applied, paralleling sweep processing is a cost effective means for achieving real time operation. By paralleling, 1024×1024 images at 60 frames per second can be generated.

Figure 7:
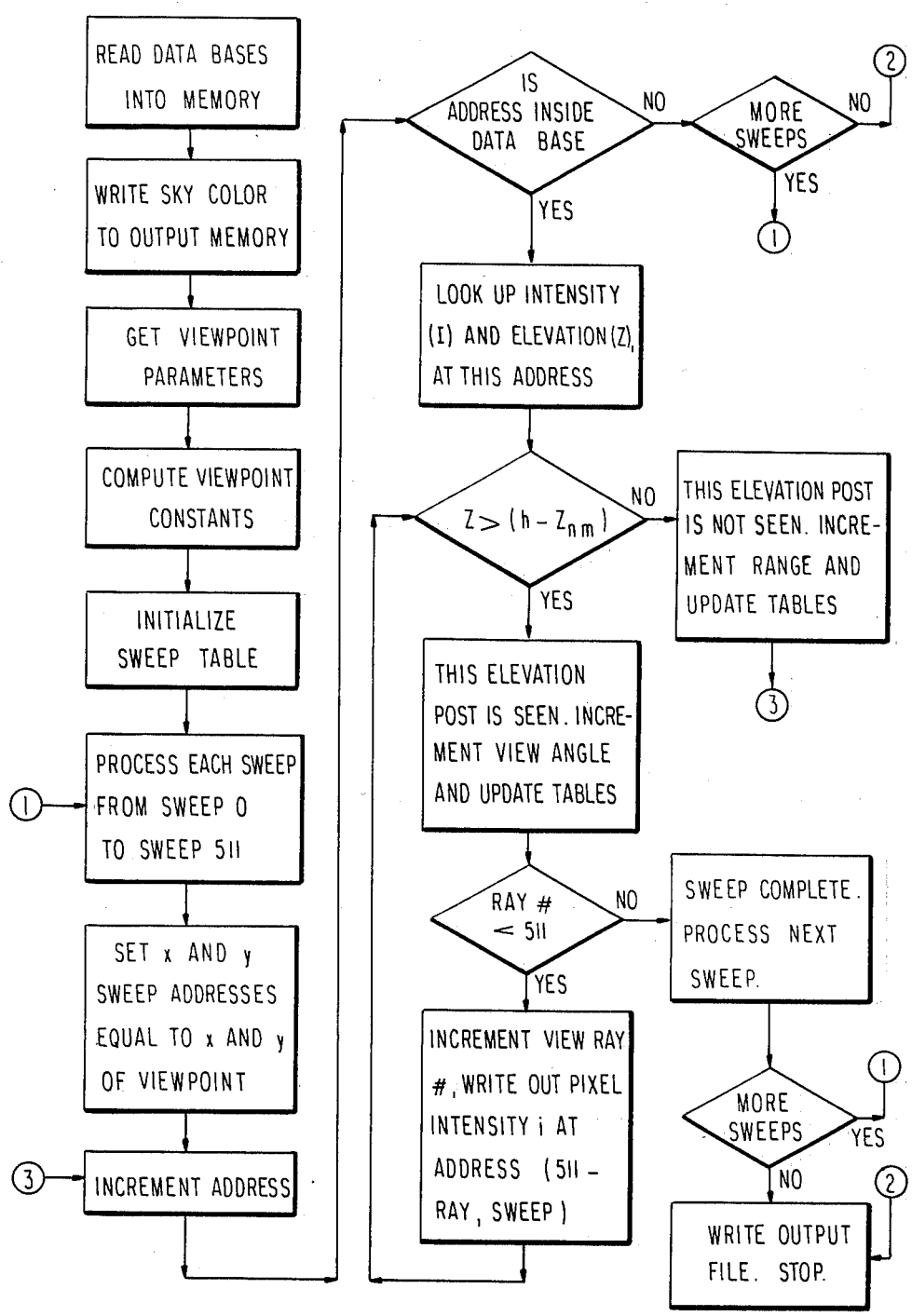
FIG. 7 is a simplified flow diagram of a software or firmware implementation of the view ray processing technique according to the invention.

The invention may be easily implemented in either software or firmware, and the basic flow chart for such implementations is shown in FIG. 7. The reader is also referred to the Appendix which is a computer program listing corresponding to the flow chart of FIG. 7. In this listing, segments of the program are delineated by brackets to indicate the operations performed, and these are summarized in Table II below:

TABLE II

| | PROGRAM OPERATIONS |
|---|---|
| A | Declaration of the variables. |
| B | Read data bases into memory. |
| C | Write sky color to output memory. |
| D | Get viewpoint parameters. |
| E | Compute viewpoint constants. |
| F | Find coordinates of the nearest block to the viewpoint. |
| G | Compute and store the coordinates of each 64 × 64 data block in the order that they will be processed. |
| H | Compute and store the minimum and maximum sweep numbers which intersect each block. If a block is outside the field of view, set minimum and maximum sweep numbers to zero. |
| I | Initialize sweep and horizon tables. |
| J | Block processing - Read 64 × 64 block into memory if some or all of it may be visible. Sweep processing (Address generator) - Check if new address is still inside block. Update sweep table with new address. Lookup elevation and intensity at this address. Compare elevation with $h - Z_{nm}$: (1) Elevation post is seen. Check if this pixel address will be visible on view window. Increment view angle, update tables $Z < (h - Z_{nm})$. (2) Elevation post is not seen. Increment range and update tables. |
| K | Transpose output array. |
| L | Write output file. |
| M | End of program. |

In Table II above and in the program listing of the following Appendix, the 512 by 512 grid data base is defined as an 8 by 8 array of data blocks where each block is a 64 by 64 array of grid points. This facilitates processing on a general purpose computer where a data block can be stored in active RAM computer memory. Otherwise the processing is the same as defined by FIG. 7.

APPENDIX

```
program viewray
! this program produces a perspective scene from DMA
! data, using DMA data bases of Concrete, Washington.

implicit none byte    outrec ( 0:511, 0:511 )
byte    elevation ( 0:511, 0:511 )
```

```
      byte      intensity ( 0:511, 0:511 )
      byte      buffer ( 0:511 ), sky
      byte      elev_block ( 0:64, 0:64 )
      byte      inten_block ( 0:64, 0:64 )

logical post_is_seen, address_in_block
      logical block_in_fov integer row, col, elev, sweep, m
      integer i, j, xb, yb, xmin(64), ymin(64)
      integer xmax, ymax, order, block, ray (0:511)
      integer maxsweep (64), minsweep (64), xi, yi real      xn, yn, xm, ym, tan_phi_m, delta_tan_phi
      real      phi, i0, x (0:511), y (0:511), xv, yv
      real      boresight, fov, znm (0:511)
      real      cos_bs, sin_bs, tan_phi, tan_half_fov
      real      m_delta_r_delta_tan_phi (0:511)
      real      delta_x ( 0:511 ), delta_y ( 0:511 )
      real      vert_boresight, tan_phi_min
      real      delta_tan_theta, n_delta_r_delta_tan_phi (0:511)
      real      sin_vert_bs, cos_vert_bs, h
      real      delta_r_init, zscale, z
      real      delta_r_tan_phi_min(0:511), delta_r_tan_phi(0:511)
      real      delta_r_delta_tan_phi, delta_r_delta_tan_phi_min
      real      r1, r2, r3, r4, o1, o2, o3, o4, tanmax, tanmin
      real      t1, t2, t3, t4, delta_r_delta_tan_phi_init
      real      delta_r_delta_tan_phi_min_init, rmax data      zscale  / 0.135 /
      data      sky     / 'C0'x /

! read in elevation and intensity data bases.
      open ( unit = 2, name = 'conce.ima ', type =
     + 'unknown', access = 'sequential', form = 'unformatted'
     + , recordtype = 'fixed', recordsize = 128 )

do yi = 0, 511
        read ( 2 ) buffer
        do xi = 0, 511
          elevation ( xi, yi ) = buffer  ( xi )
        end do
      end do
      close ( unit = 2 )

open ( unit = 3, name = 'redshade.ima ', type =
     + 'unknown', access = 'sequential', form = 'unformatted'
     + , recordtype = 'fixed', recordsize = 128 )

do yi = 0, 511
        read ( 3 ) buffer
        do xi = 0, 511
          intensity ( xi, yi ) = buffer  ( xi )
        end do
      end do close ( unit = 3 )
```

```
       ! fill output array with sky color.
       do yi = 0, 511
        do xi = 0, 511
          outrec ( xi, yi ) = sky
        end do
       end do call lib$erase_page ( 1, 1 )

type *,'delta_r ?'
       accept *, delta_r_init type *,' fov ?'
       accept *, fov type *, 'viewpoint xy ?'
       accept *, xv, yv xi = jint ( xv )
       yi = jint ( yv )
       m = elevation ( xi, yi )
       m = iand ( 255, m ) * 40
       type *, 'terrain elevation at viewpoint is', m
       type *, 'viewpoint z ?'
       accept *, h
       h = h / 296.0 type *, 'boresight ?'
       accept *, boresight type *, 'vert boresight ?'
       accept *, vert_boresight cos_bs = cosd ( boresight )
       sin_bs = sind ( boresight )
       tan_half_fov = tand ( ( fov / 2.0 ) )

sin_vert_bs = sind ( vert_boresight )
       cos_vert_bs = cosd ( vert_boresight )

! find max and min sweep which intersect each block.
       ! find the coordinates of the nearest block.
       xi = jint ( xv )
       yi = jint ( yv )
       if ( ( xv .lt. 512. ) .and. ( xv .ge. 0. )
      +   .and. ( yv .lt. 512. ) .and. ( yv .ge. 0. ) ) then
          xb = xi - mod ( xi, 64 )
          yb = yi - mod ( yi, 64 )
       else if ( ( xv .lt. 512. ) .and. ( xv .ge. 0. )
      +   .and. ( yv .gt. 511. ) ) then
          xb = xi - mod ( xi, 64 )
          yb = 448
       else if ( ( xv .lt. 512. ) .and. ( xv .ge. 0. )
      +              .and. ( yv .lt. 0. ) ) then
```

```
          xb = xi - mod ( xi, 64 )
          yb = 0
       else if ( ( yv .lt. 512. ) .and. ( yv .ge. 0. )
     +              .and. ( xv .gt. 511. ) ) then
          xb = 448
          yb = yi - mod ( yi, 64 )
       else if ( ( yv .lt. 512. ) .and. ( yv .ge. 0. )
     +              .and. ( xv .lt. 0. ) ) then
F         xb = 0
          xb = yi - mod ( yi, 64 )
       else if ( ( xv .gt. 511. ) .and. ( yv .gt. 511. ) ) then
          xb = 448
          yb = 448
       else if ( ( xv .lt. 0. ) .and. ( yv .lt. 0. ) ) then
          xb = 0
          yb = 0
       end if ! compute the block table.

! compute coordinates of each block in order of processing.
       order = 0
       do yi = yb, 0, - 64
          do xi = xb, 448, 64
             order = order + 1
             xmin ( order ) = xi
             ymin ( order ) = yi
          end do
          do xi = xb - 64, 0, -64
             order = order + 1
             xmin ( order ) = xi
             ymin ( order ) = yi
          end do
       end do G      do yi = yb + 64, 448, 64
          do xi = xb, 448, 64
             order = order + 1
             xmin ( order ) = xi
             ymin ( order ) = yi
          end do
          do xi = xb - 64, 0, -64
             order = order + 1
             xmin ( order ) = xi
             ymin ( order ) = yi
          end do
       end do ! calculate the numbers of the first and last sweeps
       ! which intersect each block.
       minsweep ( 1 ) = 0
H      maxsweep ( 1 ) = 511
       do block = 2, 64
          xn = float ( xmin ( block ) )
          yn = float ( ymin ( block ) )
```

```
        r1 = ( xn - xv ) * cos_bs + ( yn - yv ) * sin_bs
        r2 = ( xn + 64. - xv ) * cos_bs + ( yn - yv ) * sin_bs
        r3 = ( xn - xv ) * cos_bs + ( yn + 64. - yv ) * sin_bs
        r4 = (xn + 64. - xv) * cos_bs + (yn + 64. - yv) * sin_bs o1 = ( yn - yv ) * cos_bs - ( xn - xv ) * sin_bs
        o2 = ( yn - yv ) * cos_bs - ( xn + 64. - xv ) * sin_bs
        o3 = ( yn + 64. - yv ) * cos_bs - ( xn - xv ) * sin_bs
        o4 = (yn + 64. - yv) * cos_bs - (xn + 64. - xv) * sin_bs ! compute tangents to block corners.
    if ( r1 .eq. 0.0 ) then
        t1 = 0.0
    else
        t1 = o1 / r1
    end if if ( r2 .eq. 0.0 ) then
        t2 = 0.0
    else
        t2 = o2 / r2
    end if if ( r3 .eq. 0.0 ) then
        t3 = 0.0
    else
        t3 = o3 / r3
    end if
    if ( r4 .eq. 0.0 ) then
        t4 = 0.0
    else
        t4 = o4 / r4
    end if tanmax = max ( t1, t2, t3, t4 )
    tanmin = min ( t1, t2, t3, t4 )

! compute max and min sweeps which intersect this block.
    ! special cases:
    !   The max of the range variables is negative i.e. all
    !   range variables are negative, the entire block is behind
    !   the viewpoint and therefore is outside the FOV.

rmax = max ( r1, r2, r3, r4 )
    if ( rmax .le. 0.0 ) then
     maxsweep ( block ) = 0
     minsweep ( block ) = 0 else if ( ( tanmax .lt. - tan_half_fov ).and.
              ( tanmin .lt. - tan_half_fov ) ) then
     ! the entire block is outside the fov to the left
     ! looking from the viewpoint along the boresight.
     maxsweep ( block ) = 0
     minsweep ( block ) = 0
```

```
       else if ( ( tanmax .gt. tan_half_fov ).and.
                  ( tanmin .gt. tan_half_fov ) ) then
         ! the entire block is outside the fov to the right
         ! looking from the viewpoint along the boresight.
         maxsweep ( block ) = 0
         minsweep ( block ) = 0 else
         ! some or all of the block is inside the fov.
         if ( tanmin .lt. - tan_half_fov ) then
           minsweep ( block ) = 0
         else
           minsweep ( block ) = jint ( 255.0 + tanmin /
                                tan_half_fov * 256.0 )
         end if if ( tanmax .gt. tan_half_fov ) then
           maxsweep ( block ) = 511
         else
           maxsweep ( block ) = jint ( 255.0 + tanmax /
                                tan_half_fov * 256.0 )
         end if end if end do ! initialize sweep and horizon tables.
     tan_phi_min = tand ( ( fov / 2.0 ) - vert_boresight )

delta_tan_phi = tan_half_fov / 256.0 delta_r_delta_tan_phi_init =
   + delta_r_init * delta_tan_phi delta_r_delta_tan_phi_min_init =
   + delta_r_init * tan_phi_min do m = 0, 511
       x ( m ) = xv
       y ( m ) = yv
       tan_phi_m = float ( 255 - m ) / 256.0 * tan_half_fov delta_x ( m ) = delta_r_init * ( cos_bs + sin_bs
   +     * tan_phi_m )

delta_y ( m ) = delta_r_init * ( sin_bs - cos_bs
   +     * tan_phi_m )

delta_r_tan_phi ( m ) = delta_r_delta_tan_phi_init delta_r_tan_phi_min ( m ) =
   +   delta_r_delta_tan_phi_min_init end do
```

```
! process each block.
do block = 1, 64
 type *, 'block', block
 xmax = xmin ( block ) + 63
 ymax = ymin ( block ) + 63

! if some or all of this block is in the field of
 ! view, read in the elevations and intensities.
 block_in_fov = .true.
 if ( ( minsweep ( block ) .eq. 0 ).and.
      ( maxsweep ( block ) .eq. 0 ) )
      block_in_fov = .false.
 if ( block_in_fov ) then
   do yi = ymin ( block ), ymax + 1
    do xi = xmin ( block ), xmax + 1
     elev_block ( xi - xmin ( block ),
       yi - ymin ( block ) ) = elevation ( xi, yi )
    end do
   end do do yi = ymin ( block ), ymax + 1
    do xi = xmin ( block ), xmax + 1
     inten_block ( xi - xmin ( block ),
       yi - ymin ( block ) ) = intensity ( xi, yi )
    end do
   end do
 end if do sweep = minsweep ( block ) , maxsweep ( block )

address_in_block = .true.
  do while ( address_in_block )
   xm = x ( sweep ) + delta_x ( sweep )
   ym = y ( sweep ) + delta_y ( sweep )

if ( ( jint (xm).lt. xmin ( block ) ).or.
          ( jint (xm).gt. xmax ).or.
          ( jint (ym).lt. ymin ( block ) ).or.
          ( jint (ym).gt. ymax ) ) then
    ! address is outside block.
    address_in_block = .false.
   else ! address is in block, update sweep table.
    x ( sweep ) = xm
    y ( sweep ) = ym ! find elevation and intensity for this address.
     xi = jint ( xm ) - xmin ( block )
     yi = jint ( ym ) - ymin ( block )
     elev = elev_block ( xi, yi )
     z = float ( iand ( 255, elev ) ) * zscale
     i0 = inten_block ( xi, yi )

post_is_seen = .true.
     do while ( post_is_seen )
```

```
               ! compare elevation z to znm in sweep table.
                if ( z .gt. ( h - znm ( sweep ) ) ) then
                  ! Post is seen. Write out intensity, increment angle
                  ! and update tables.
                  if ( ray ( sweep ) .lt. 512 ) then
                     ray ( sweep ) = ray ( sweep ) + 1
                     outrec ( 512 - ray ( sweep ), sweep ) = i0
                       znm ( sweep ) = znm ( sweep )
   +                   - n_delta_r_delta_tan_phi ( sweep )
                       m_delta_r_delta_tan_phi ( sweep ) =
   +                   m_delta_r_delta_tan_phi ( sweep )
   +                   + delta_r_tan_phi ( sweep )

else
                     post_is_seen = .false.
                  end if else

! Post is not seen. Increment range and update horizon table.
                  post_is_seen = .false.

znm ( sweep ) = znm ( sweep ) -
   +              m_delta_r_delta_tan_phi ( sweep )
   +              + delta_r_tan_phi_min ( sweep )
                  n_delta_r_delta_tan_phi ( sweep ) =
   +              n_delta_r_delta_tan_phi ( sweep )
   +              + delta_r_tan_phi ( sweep )

end if ! if ( z .gt. ( h - znm ( sweep ) )
              end do ! while ( post_is_seen )
            end if ! address is in block.
          end do ! while ( address_in_block )
        end do ! sweep = minsweep, maxsweep
      end do ! do block = 1, 64 call xpose ( outrec )

! write results to output file.
      open ( unit = 1, name = 'grid.ima', type =
   + 'new', access = 'sequential', form = 'unformatted'
   + , recordtype = 'fixed', recordsize = 128, initialsize
   + = 512 )
      do col = 0, 511
        do row 0, 511
          buffer ( row ) = outrec ( row, col )
        end do
        write ( 1 ) buffer
      end do
      close ( unit = 1 )

stop
      end
```

I claim:

1. A method of real-time computer generation of visual scenes comprising the steps of storing a grid data base of elevation posts at predetermined intervals for the visual scene to be generated, defining a horizontal field of view as a predetermined number of sweep increments perpendicular to a boresight at a view point, incrementing the change in range $\Delta R$ from the view point and for each sweep, defining the changes $\Delta X$ and $\Delta Y$ in said grid data base, accumulating $\Delta X$ and $\Delta Y$ to generate an X,Y data base address for extracting the elevation for that sweep element, for each range increment $\Delta R$, stepping a view ray down by a increment of $\Delta R \tan \phi_m$, where m refers to the $m^{th}$ view ray, for each range increment $\Delta R$, increasing the distance between sweeps by the increment $\Delta R \Delta \tan \phi$, comparing at each range increment the accumulated elevation value of the view ray with the elevation extracted with said X,Y data base address, and if a view ray strikes an elevation post, reading the data for that post to a display means, otherwise reading the elevation data for the next elevation post from the data base.

2. The method according to claim 1 wherein the step of storing further includes storing corresponding color data for each of said elevation posts.

3. A computer image generator that is capable of generating in real time visual images of perspective scenes, comprising:

first register means for storing a value corresponding to $\Delta R \Delta \tan \phi$, where $\Delta R$ is an incremental change in range and $\Delta \tan \phi$ is an incremental change in the tangent of the view angle;

first accumulator means connected to said first register means for accumulating a value corresponding to n R Tan which is the increment value resulting in incrementing the tangent of the view angle n times;

second accumulator means connected to said first register means for accumulating a value corresponding to $\Delta R \tan \phi_{min} - m \Delta R \Delta \tan \phi$ which is the increment value resulting in incrementing the range, said second accumulator means being preloaded with the value $\Delta R \tan \phi_{min}$ where $\phi_{min}$ is the angle defining the edge of the vertical field of view;

third accumulator means connected to said first and second accumulator means to receive as its input the output of a selected one thereof, said third accumulator means being preloaded with a value corresponding to h, the elevation of the view point, and accumulating a value corresponding to $h - Z'_{nm}$, where $Z'_{nm}$ is the view ray projection of the $n^{th}$ range increment and the $m^{th}$ increment of the view angle tangent;

first memory means for storing a Z grid data base of elevation posts of predetermined intervals for the visual scene to be generated;

addressing means for generating an X,Y address for said Z grid data base corresponding to $N^{th}$ range increment and the $m^{th}$ increment of the view angle tangent; and comparing means connected to said third accumulator means and said memory means for providing a first output if the value of the output of said third accumulator means is greater than or equal to the addressed value in said memory means and a second output if the value of the output of said third accumulator means is less than the addressed value in said memory means, said first output causing selection of the output of said first accumulator means as the input to be supplied to said third accumulator means and causing said second accumulator means to be decremented, and said second output causing selection of the output of the said second accumulator means as the input to be supplied to said third accumulator means, causing the addressed data in said first memory means to be read out to said third accumulator means and causing said first accumulator to be incremented.

4. The computer image generator as recited in claim 3 further comprising second memory means for storing intensity data corresponding the elevation posts of the data base stored in said first memory means, said second memory means also being addressed by said addressing means and responsive to the first output of said comparing means for reading out addressed intensity data.

5. The computer image generator as recited in claim 3 wherein said first accumulator means comprises second register means, first and second gate means and first summing means, said first gate means being responsive to said second output of said comparing means for supplying the output of said second register means to one input of said first summing means, the second input of said first summing means being connected to said first register means, and said second gate means being responsive to said first output of said comparing means to supply the output of said second register means to said third accumulator means, and wherein said second accumulator means comprises third register means, third and fourth gate means and second summing means, said third gate means being responsive to said first output of said comparing means for supplying the output of said third register means to one input of said second summing means, the second input of said second summing means being connected to said first register means, and said fourth gate means being responsive to said second output of said comparing means for supplying the output of said third register means to said third accumulator means.

6. The computer image generator according to claim 3 wherein said first accumulator means comprises range counter means which is incremented in response to the second output of said comparing means and read out to said third accumulator means in response to the first output of said comparing means and wherein said second accumulator means comprises view ray counter means which is decremented in response to the first output of said comparing means and read out to said third accumulator means in response to the second output of said comparing means.

* * * * *